United States Patent [19]
Hechler, IV

[11] 4,086,937
[45] May 2, 1978

[54] DUAL HOSE

[76] Inventor: Valentine Hechler, IV, 26 Meadow View Rd., Northfield, Ill. 60093

[21] Appl. No.: 712,230

[22] Filed: Aug. 6, 1976

[51] Int. Cl.² .................. F16K 19/00; F16L 11/06
[52] U.S. Cl. .................................... 137/559; 137/604; 138/115
[58] Field of Search .................... 137/559, 604; 138/DIG. 1, 111, 115, 116, 117

[56]  References Cited
U.S. PATENT DOCUMENTS

| 2,139,888 | 12/1938 | Fausek | 138/115 |
| 2,236,171 | 3/1941 | Garretson | 138/111 UX |
| 2,663,325 | 12/1953 | Bede | 138/115 X |
| 3,038,495 | 6/1962 | Fortin | 137/559 |
| 3,470,826 | 10/1969 | Foulds | 137/604 X |
| 3,907,002 | 9/1975 | Gulich | 138/115 |

FOREIGN PATENT DOCUMENTS 1,123,331  8/1968  United Kingdom ............. 138/111

Primary Examiner—Robert G. Nilson
Attorney, Agent, or Firm—Watson D. Harbaugh

[57]  ABSTRACT

A unitary supply means for two separate liquids comprising a flexible supply hose unit defining at least two conduits generally of different sizes, one of which preferably is transparent, having an integral common wall reinforcement of extra thickness between them urging the hose to straighten against kinking and providing short free ends for each conduit of different lengths for mating longitudinally spaced series of connections or couplings with appropriate liquid supplies and mixer inlets, the couplings in the solute line being self-tightening under longitudinal stretch strains, and preferably in combination with means for adjusting the relative rates of flow of the liquids through the several mixing chambers.

6 Claims, 5 Drawing Figures

DUAL HOSE

CROSS-REFERENCES

Hechler application Ser. No. 520,676, filed Nov. 4, 1974, now U.S. Pat. No. 3,984,053.

Hechler application Ser. No. 716,896, filed Aug. 20, 1976, entitled JET PUMP PROPORTIONERS.

BACKGROUND OF INVENTION

Upon many occasions extensive mixing and application of liquid mixtures over a large area can be manually accomplished most expeditiously by light hose connections to stationary containers of solute and solvent. However, friction of flow, particularly of solute in the hoses, can involve undesirable variations in the ratio of the solution dispensed. Also, entanglement of hoses, misconnecting and variable solute conditions can also present problems relating to providing proper mixture ratios.

As described in application Ser. No. 520,676, now U.S. Pat. No. 3,984,053 it is desirable to supply solute at the entrace of the mixer at a constant pressure preferably within a plus or minus pressure which is close to atmospheric pressure. Accordingly, the length and the size of the solute tube in the supply hose unit is large enough to substantially minimize frictional drag upon flow speed, yet not large enough to require an inordinate amount of solute to fill it.

As described in co-filed application Ser. No. 716,896, filed Aug. 20, 1976 entitided "Jet Pump Proportioners", adjustments at the mixer are made to vary the relative flow rates, preferably of the solvent, through the several mixing stages. This permits the adjustment of the relative solvent flow to the several stages thereby accommodating any appreciable changes in the solute flow rate in the supply hose unit which might be due to length or viscosity for ultimate proportioning accuracy.

In the present invention a dual hose unit is provided, having its connections staggered as a pattern index for distinguishing the conduits and their appropriate connections at the mixer-dispenser as well as at any sections of the conduit units if more than one are connected serially.

IN THE DRAWINGS

DESCRIPTION OF THE INVENTION

Figure 1:
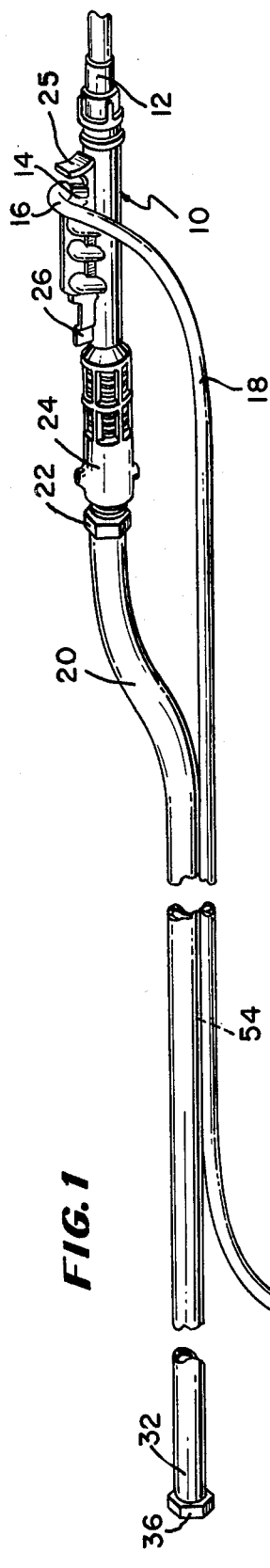
FIG. 1 is a perspective view of a mixer and hose supply of solvent and solute thereto embodying the invention.

As more particularly described in application Ser. No. 520,676, now U.S. Pat. No. 3,984,053 a portable mixing-dispensing device 10 is illustrated in FIG. 1 having a dispensing nozzle 12 at its outlet end, and a solute supply inlet having a nipple 14 receiving the end 16 of the solute supply tube 18 connected thereto. A solvent supply tube 20 is connected by a coupling 22 to the inlet end 24 of the mixer and a thumb-actuated slider is moved to control the discharge of solvent while a latch 26 may be selectively actuated to discharge solute along with the solvent each actuation of the slider 25.

The solvent carrying hose 20 is nylon reinforced against stretching with a vinyl coating and the solute tubing 18 is polyvinylchloride (PVC) tubing which preferably is transparent and has a stretchability factor for a purpose. The unstretchable solvent hose is used to stabilize the solute hose against overstretching.

Figure 2:
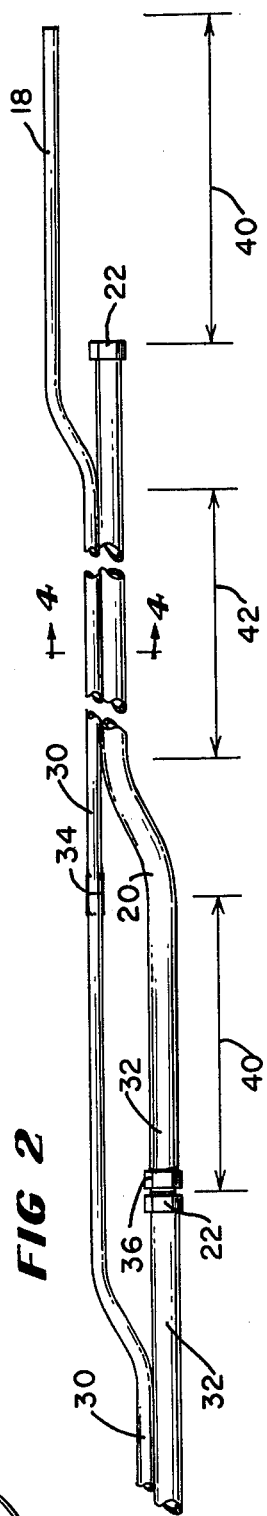
FIG. 2 is a plan view of two sections of the hose supply unit connected together.
Figure 3:
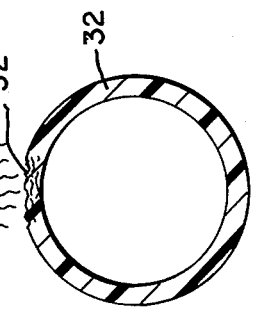
FIG. 3 is a cross-sectional view illustrating the method of heating two independent hoses preparatory to bringing the heat-softened vinyl thereof together under pressure.
Figure 4:
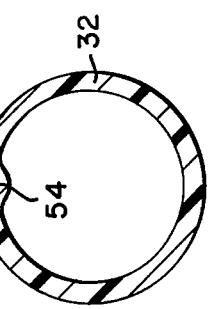
FIG. 4 is a sectional view of the final dual conduit supply hose taken on line 4—4 in FIG. 2.

For this purpose, and referring to FIG. 3, the lengths of the two tubes 18 and 20 are the same. They are staggered longitudinally with respect to each other as indicated by the distance 40 (FIG. 2) and over their coinciding length portions as shown in FIG. 3 they are supported in spaced relation from each other, preferably horizontally, a short distance from a high heat radiating heater 50 disposed between them. When the adjacent portions of the tubes begin to soften with an irregularity of their surface appearing at 52, the heater is removed laterally and the tubes brought together with a compressive force in a relation in which the melting portions engage and fuse with each other under rapid cooling conditions to stop migration of heat and harden the joined material in the shape shown in FIG. 4 to form a common integrated backbone 54 thickening which strengthens the hose against linking and normally urges the conduits to be straight as a unit over their joined length 42 when handled.

Thus, hoses and tubing unitized as shown in FIG. 1 may be connected to other like supply units as shown in FIG. 2, the distance indicated by arrows 40 indicating the spacing between the respective connections 29, 16 to accommodate the distance between the mixer connections 24, 14, respectively. The lineal offsetting of the ends of the hose 20 and tubing 18 accommodates the spacing between the outlets of the solvent and solute sources respectively at one end and the spaced connections 14 and 24 on the mixer at the other end.

Preferably, the smallest solute supply tube 30 is used, which with its flow friction size or length, or both, will perform within a ratio accuracy adjustably attained under expected working conditions. The solvent carrying hose 20 is of a standard size for a rated six-gallon-per-minute pressure flow and may be of any reasonable length to reach a source of water under pressure. The solute tube 30 is long enough to connect the solute source to the mixer with minimized length and pressure flow loss.

These tubes and hoses, if they were independent, could become entangled and the small size solute become kinked in a way varying important flow characteristics expected of the solute supply, but as unitized the major dimensions of the cross section of the integrated hose when coiled orients itself approximately parallel with the axis of a hose storage reel (not shown) and prevents any twisting or turning of the dual conduit when being handled. Also, the solute supply can be elevated gravitationally, if desired. to provide some flow pressure for mixture accuracy if the supply hose if of some length thereby favoring adjustable dispensing ratio accuracy.

Figure 5:
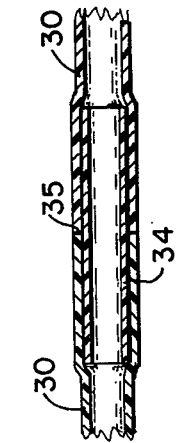
FIG. 5 is an enlarged sectional view of the frictional couplings used in the solute supply conduit.

Other advantages and relations accrue with the characteristics described. Not only does the reinforced hose 20 prevent the solute tube 18 from stretching, except at its free ends, but referring to FIG. 5, the ends of the vinyl solute tubing can receive coupling nipples 34 whose outside diameter (OD) is 20% larger than the inside diameter (ID) of the solute tube for a stretched overlap distance in excess of one and a quarter diameters as at 14 or for each tube in connecting the ends of the tubes 30 together. Preferably the length of the interengagement is greater than two and a half times the inside diameter of the vinyl tube 30.

In assembly an endwise pressure on the tube 30 against the nipple 34 progressively increases the tubes inside diameter more than 20% and as it slips on the nipple 34 it tends to contract where the overlap exists. However, the progressive frictional pressure developed by the contraction maintains sufficient counter support of the tube end for the desired length of overlap to be accomplished. Upon release of the push-on pressure the tube 30 shrink tightens under its resiliency and frictionally engages the surface of the nipple 34. The tightening and frictional resistance holds the tube end against removal and any attempt to remove the tube by pulling it is opposed by a friction which increases with any longitudinal stretching of the tube, and, merely further tightens deeper portions of engagement.

The only way to remove the tube is an easy one. A person merely inserts his fingernails at the joint 35 against the end of the hose and pushes it off with the same force in reverse that was applied at its end installing it.

The external smoothness at the joint 35 prevents this occurring by any means other than equivalent means as well as providing extra conduit lengths whose joints will not catch on any other things that might induce this inadvertent movement.

The tubes are provided in lengths of 25 feet, and as already indicated, are offset longitudinally 12 to 20 inches at their ends, and although adhered together over the major portion of their overlapping lengths, they have free ends of unequal lengths accommodating the relative locations of solute and solvent supply couplings at one end, and the connections to the mixing dispensing gun at the other end. In this relationship of their connections, plural lengths of hose may be connected together as offset from each other.

The solvent hose may be of a regular ⅜ inch I.D. size since such generally handles municipal water as a well-known standard unit. The solute tube preferably has an inside diameter of ⅜ inch for a 1:24 mixture ratio mixer.

Thereby, a great deal of flexibility in the use and handling of the mixer-dispenser is provided for excellent maneuverability is dispensing large or small quantities of mixture having close ratio accuracies.

What is claimed is:

1. A liquid mixture dispensing device comprising:
    a portable manually controlled proportioning and mixing aspirator dispenser having respective inlet ports longitudinally spaced from each other a predetermined distance to receive a solvent and a solute separately in longitudinally spaced relation;
    a dual liquid supply hose unit having solvent and solute inlets and outlets likewise spaced in longitudinally spaced relation and connected to said respective inlet ports and solvent and solute inlet likewise spaced and connected to sources of supply of solvent and solute respectively;
    said supply hose unit comprising flexible conduit elements of different flow characteristics having fusible materials engaging each other in fused relationship over a major portion of their length intermediate the groups of said spaced inlets and outlets,
    said fused materials forming a common integrated reinforcing rib means of an extra thickness at its center of fusion in a plane connecting the center lines of said tubes greater than the respective thickness of the fused material adjacent thereto on opposite sides of said connecting plane, to bend in all directions yet normally urge the conduits to be straight as a unit over their joined length.

2. The combination called for in claim 1 in which the solute tube is of a stretchable material and the connector comprises a nipple having an outside diameter approaching a size 20% larger than the inside diameter of the solute tube.

3. The device defined in claim 1 in which the solvent conduit is a reinforced tube capable of carrying high pressures and the solute conduit element is a low pressure flexible element.

4. The unitary flexible supply hose unit defined in claim 3 in which said unit includes short free ends of each conduit of unequal length terminating in inlet and outlet means longitudinally spacing the connectors from each other at both ends of the unit.

5. The unitary hose unit defined in claim 3 in which the smaller conduit is flexible and transparent for the observance of the liquid prime thereof.

6. The unitary hose unit defined in claim 3 in which the larger conduit is reinforced to withstand substantial gauge pressures to straighten and maintain the smaller size conduit straight.

* * * * *